Figure 1:
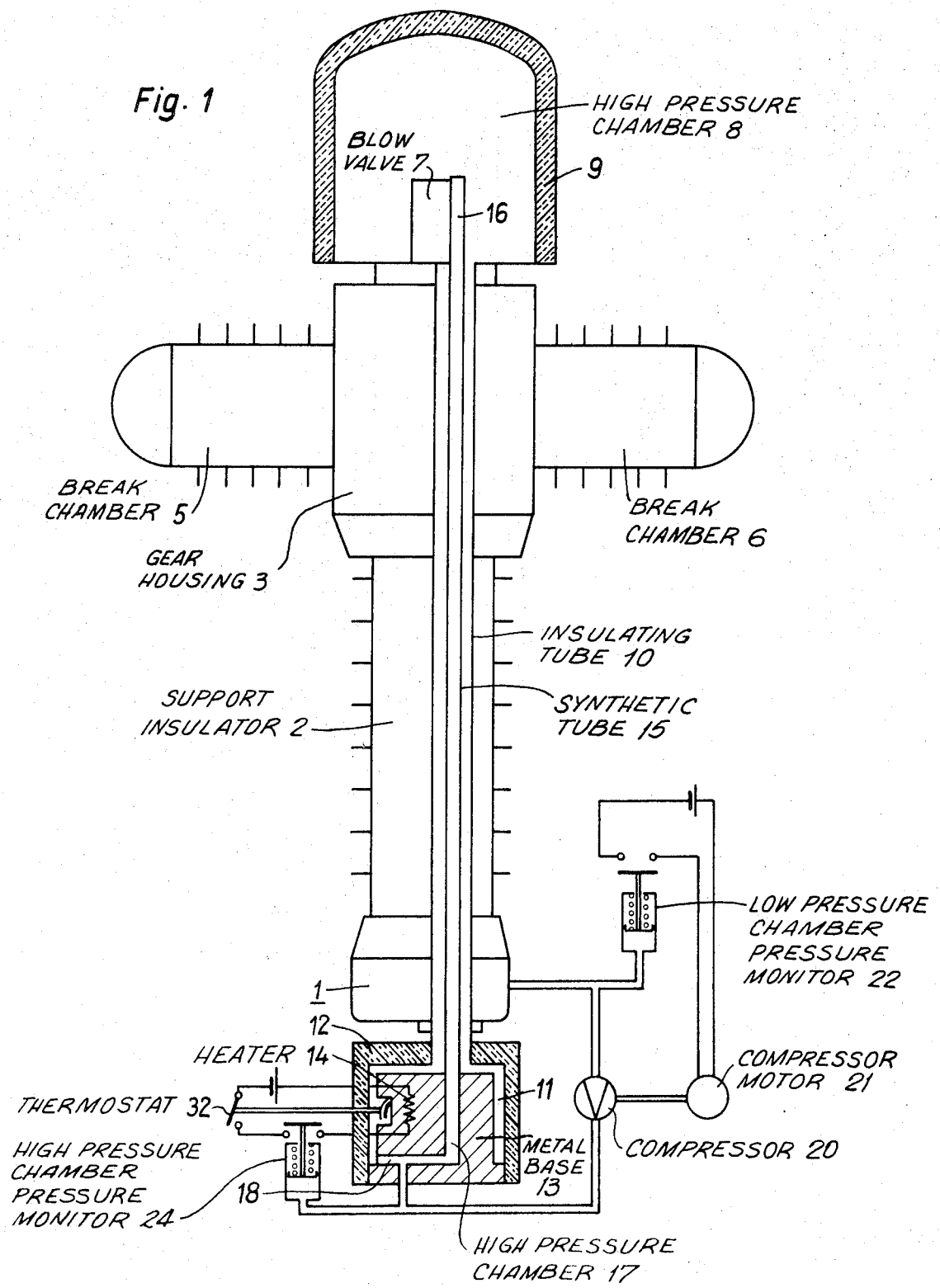

United States Patent [19]
Beierer

[11] 3,721,798

[45] March 20, 1973

[54] PRESSURE GAS SWITCH
[75] Inventor: Joachim Beierer, Berlin, Germany
[73] Assignee: Siemens Aktiengesellschaft, Berlin, Germany
[22] Filed: Feb. 24, 1971
[21] Appl. No.: 118,354

[30] Foreign Application Priority Data

March 3, 1970 Germany..................P 20 10 690.5

[52] U.S. Cl..............219/209, 200/148 B, 200/148 E
[51] Int. Cl................................................H05b 1/00
[58] Field of Search........200/148 B, 148 R; 219/209

[56] References Cited

UNITED STATES PATENTS 3,303,310  2/1967  McKeough et al................200/148 B

OTHER PUBLICATIONS

German Printed Application. Kesselring et al., 1,158,147, 11/63, 200/148 B

Primary Examiner—C. L. Albritton
Attorney—Curt M. Avery, Arthur E. Wilfond, Herbert L. Lerner and Daniel J. Tick

[57] ABSTRACT

The heater of a pressure gas switch is switched on and off by a regulating device which operates in accordance with the pressure of quencher gas in a closed gas cycle system. A decrease in the pressure switches the heater on and an increase in the pressure switches the heater off. The quencher gas is preferably sulphur hexafluoride.

6 Claims, 2 Drawing Figures

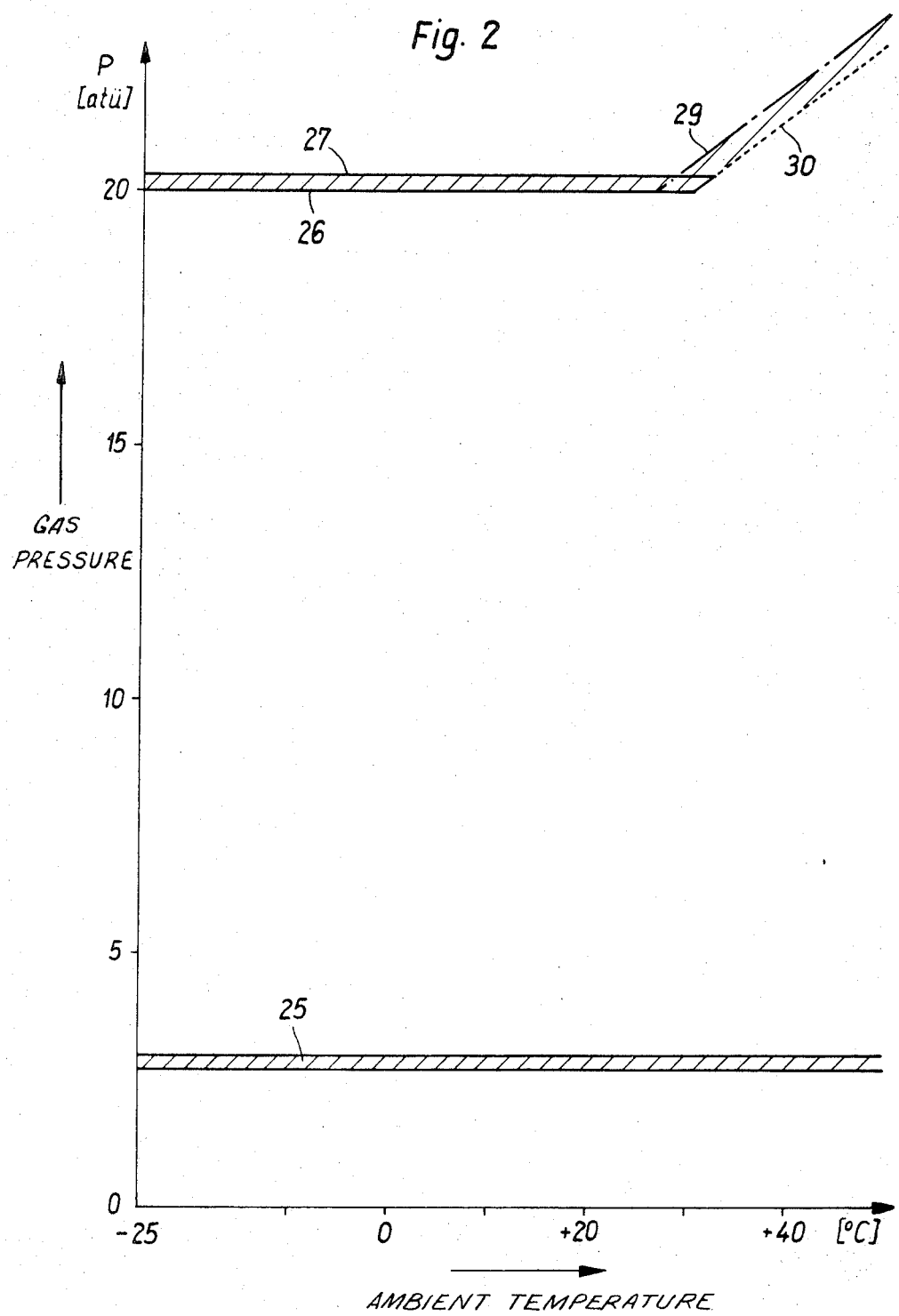

PRESSURE GAS SWITCH

DESCRIPTION OF THE INVENTION

The invention relates to a pressure gas switch and more particularly, to a pressure gas switch with a heating system having a heater which is switched on and off by a regulating device to prevent condensation of the quencher gas in a closed gas cycle system. This is important particularly for pressure gas switches of a closed gas cycle system which operate with sulphur hexafluoride ($SF_6$) or a similar, easy to condense, heavy gas as the quencher gas.

The heating system of pressure gas switches of the aforedescribed type has heretofore been switched on and off in accordance with temperature. To this end, thermostats were arranged at one or more measuring points in the switch. These thermostats started or initiated the heating either directly or via a magnetic switch, and discontinued it when a desired operating temperature was attained. By contrast, the object of the invention is a reduction in the output required for regulating purposes.

The essence of the invention is that the heating system is controlled by the pressure of the quencher gas in a manner whereby a decrease in the pressure causes the energization of the heating system and an increase in the pressure causes the deenergization of the heating system. Temperature-dependent regulating members are therefore completely dispensed with pressure monitors are preferably utilized to control the electric heating system. Each of the pressure monitors are provided with a contact which is actuated by a piston against the action of a spring. Such pressure monitors have been successfully tested, and are simple and inexpensive components. Hence, the invention offers the desired reduction in the output for the control of the heating system.

As previously mentioned, the invention is particularly advantageous for pressure gas switches with a closed gas cycle system. In switches of this type, a compressor is usually positioned between a high pressure chamber and a low pressure chamber. The compressor pumps drawn-in quencher gas from the low pressure chamber into the high pressure container, in order to provide the desired pressure difference. The heating system is controlled by the high pressure chamber since, due to the higher pressure, a condensation of the gas may occur there first. A further feature of the invention is that the heating system is controlled by the pressure in the high pressure chamber and the compressor is controlled by the pressure in the low pressure chamber. The control of the compressor produces a sufficiently constant gas volume so that outside temperature fluctuations may be easily compensated by the control of the heating system in accordance with the pressure in the high pressure chamber.

In accordance with a preferred feature of the invention, a pressure switch includes a closed gas cycle system having a sulphur hexafluoride quencher gas, a heating system for the gas cycle system having a heater and regulating means for switching the heater on and off in order to prevent condensation of the quencher gas. Pressure means in the gas cycle system are coupled to the regulating means for controlling the heater in accordance with the pressure of the quencher gas in a manner whereby a decrease in the pressure of the quencher gas switches the heater on and an increase in the pressure of the quencher gas switches the heater off.

The heater of the heating system comprises an electric heater, the regulating means comprises electrical contact means, and the pressure means comprises a piston connected to the electrical contact means and controlled in position by the pressure of the quencher gas, and a spring working against the movement of the piston.

The above-mentioned pressure means probably comprises a high pressure chamber in the closed gas cycle system accommodating the heater of the heating system and coupled to the regulating means, the pressure of the high pressure chamber controls the regulating means. A gas compressor in the closed gas cycle system between the high pressure chamber and a low pressure chamber is coupled to the low pressure chamber for compressing the quencher gas under the control of the pressure in the low pressure chamber.

In the event that individual components fail in the control device of the heating system of the invention, in dependence on the pressure of the quencher gas, it is expedient to provide a thermostat for deenergizing the heating system. The thermostat responds at a very high predetermined temperature to switch the heating system off. The thermostat also functions to prevent the heating system from operating when the amount of quencher gas is insufficient in the chamber being heated.

In order that the invention may be readily carried into effect, it will now be described with reference to the accompanying drawings, wherein:

FIG. 1 is a schematic diagram of an embodiment of a pressure gas switch of the invention utilized as a circuit breaker; and FIG. 2 is a graphical presentation of ambient temperature versus gas pressure.

FIG. 1 illustrates a two stage sulphur hexafluoride switch with a closed gas cycle system utilized as a circuit breaker for 220 volts, for example. The closed gas cycle system comprises a base structure 1 at ground potential which supports a high support or hollow protection insulator 2. A metal gear housing 3 having a high voltage potential is affixed to the support insulator 2.

The gear housing 3 has two break chambers 5 and 6, which extend horizontally, on opposite sides thereof. Both break chambers 5 and 6 are connected in electrical series through the metal gear housing. A high pressure chamber 8, which is covered by a heat insulation 9, is seated on the gear housing 3. The high pressure chamber 8 contains a blow valve 7, which directs the flow of pressure gas to the break chambers 5 and 6, and from the break chambers into the gear housing 3, which functions as the low pressure chamber.

From the high pressure chamber 8, an insulating tube 10 leads to another high pressure chamber 11, which is positioned below the base structure 1, that is, at ground potential. The high pressure chamber 11 has heat insulation 12. It comprises a metal base 13 whereinto a heater 14 of a heating system is installed or accommodated. Furthermore, a synthetic tube 15 runs through the tube 10 and projects, at its upper end 16, beyond the edge of the tube 10, into the high pressure chamber 8. The lower end 17 of the tube 15 is placed in a channel or duct 18 which leads through the metal mass 13.

The quencher or quenching gas in the gas system is preferably sulphur ($SF_6$), or a similar, easy to condense, heavy gas. The pressure of the high pressure gas in the switch amounts to about 20 atmospheres. However, in the low pressure chamber, the sulphur hexafluoride ($SF_6$) is below a pressure of 3 atmospheres. The pressure difference is maintained by a compressor 20, which draws the sulphur hexafluoride from the gear housing 3, across the hollow protection insulator 2 and the interior of the base structure 1. The gear housing 3 and insulator 2 are also part of the low pressure chamber of the gas cycle system. A compressor motor 21 is controlled by a low pressure chamber pressure monitor 22, which is coupled to the low pressure chamber 1, 2, 3.

The heater 14 is controlled by a high pressure chamber pressure monitor 24, which is coupled to the high pressure container 11. This results in the operating characteristics FIG. 2 of the gas pressure in the switch, in dependence on the ambient temperature, as illustrated in FIG. 2. In FIG. 2, the absissa represents the ambient temperature in degrees centigrade and the ordinate represents the gas pressure in atmospheres.

The compressor 20 is exclusively controlled by the low pressure. To this end, the pressure monitor 22 is provided with two working points, compressor on and compressor off, so that the working or operating area or region 25 of the compressor 20 remains the same in the entire temperature range of −25° to +50°C.

The region 25 (FIG. 2) in the low pressure chamber 1, 2, 3 would correspond, for the high-pressure chamber, to a pressure range or region in the high pressure chamber which is variable depending on the temperature. The control of the heater 14 of the heating system, in accordance with the invention, which utilized the pressure monitor 24, having operating characteristics 26 and 27, keeps the pressure largely constant, through the supply of heat.

At 20 atmospheres, and in opposition to the gas pressure which acts upon the piston of the pressure monitor 24, a spring close the energizing circuit of the heater 14, via electrical contacts. The energizing circuit of the heater 14 is again interrupted following the increase in pressure caused by heating. Only at higher temperatures than 25° or 30° C, the pressure increases according to lines 29 and 30 of FIG. 2, above the rated pressure of 20 atmospheres, despite the fact that the heater 14 of the heating system is deenergized. This increase in pressure is completely harmless, however. It remains, for example, far below the safety rating of the high pressure chamber.

It is readily seen that the invention permits a simple control of the heater 14. Furthermore, practical tests have shown that the invention constitutes a considerable reduction in the control output or expenditure, as compared to a heat-dependent control.

A thermostat constituting a contact 32, actuated by a bimetal element and connected in the energizing circuit of the heater 14, insures that, even when the switch contains no gas, the heater will not reach temperatures which may have a detrimental effect.

While the invention has been described by means of a specific example and in a specific embodiment, I do not wish to be limited thereto, for obvious modifications will occur to those skilled in the art without departing from the spirit and scope of the invention.

I claim:

1. In a pressure switch including a closed gas cycle system having a sulphur hexafluoride quencher gas, a heating system for the gas cycle system having a heater and regulating means for switching the heater on and off to prevent condensation of the quencher gas, pressure means in the gas cycle system coupled to the regulating means for controlling the heater in accordance with the pressure of the quencher gas so that a decrease in the pressure of the quencher gas switches the heater on and an increase in quencher gas pressure switches the heater off.

2. In a pressure switch as claimed in claim 1, wherein the heater of the heating system comprises an electric heater, the regulating means comprises electrical contact means, and the pressure means comprises a piston connected to the electrical contact means and controlled in position by the pressure of the quencher gas, and a spring working against the movement of the piston.

3. In a pressure switch as claimed in claim 1, wherein the pressure means comprises a high pressure chamber in the closed gas cycle system accommodating the heater of the heating system and coupled to the regulating means, the high pressure chamber having a pressure for controlling the regulating means, a low pressure chamber disposed in the closed gas cycle system and a gas compressor in the closed gas system between the high pressure chamber and the low pressure chamber and coupled to the low pressure chamber for compressing the quencher gas under the control of the pressure in the low pressure chamber.

4. A pressure switch as claimed in claim 1, comprising thermostatic means connected to the heater of the heating system for switching the heater off at and above a predetermined temperature.

5. In a pressure switch as claimed in claim 2, further comprising thermostatic means electrically connected to the heater of the heating system for switching the heater off at and above a predetermined temperature.

6. In a pressure switch as claimed in claim 2, wherein the pressure means comprises a high pressure chamber in the closed gas cycle system accommodating the heater of the heating system and coupled to said piston, the high pressure chamber having a pressure which controls the electrical contact means via the piston, a low pressure chamber in the closed gas cycle system; and a gas compressor in the closed gas cycle system between the high pressure chamber and the low pressure chamber and coupled to the low pressure chamber for compressing the quencher gas under the control of the pressure in the low pressure chamber.

* * * * *